Jan. 5, 1971 — C. YATES, JR — 3,552,845
DISPLAY DEVICE
Filed Feb. 19, 1968
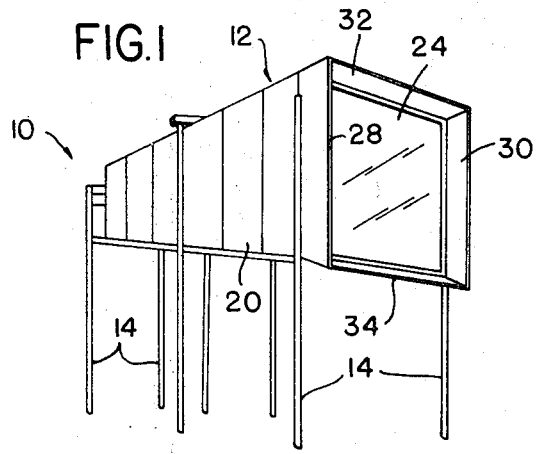
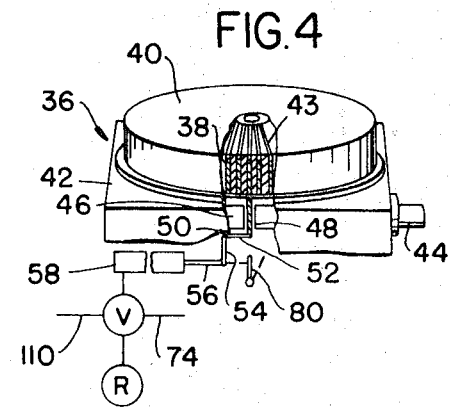
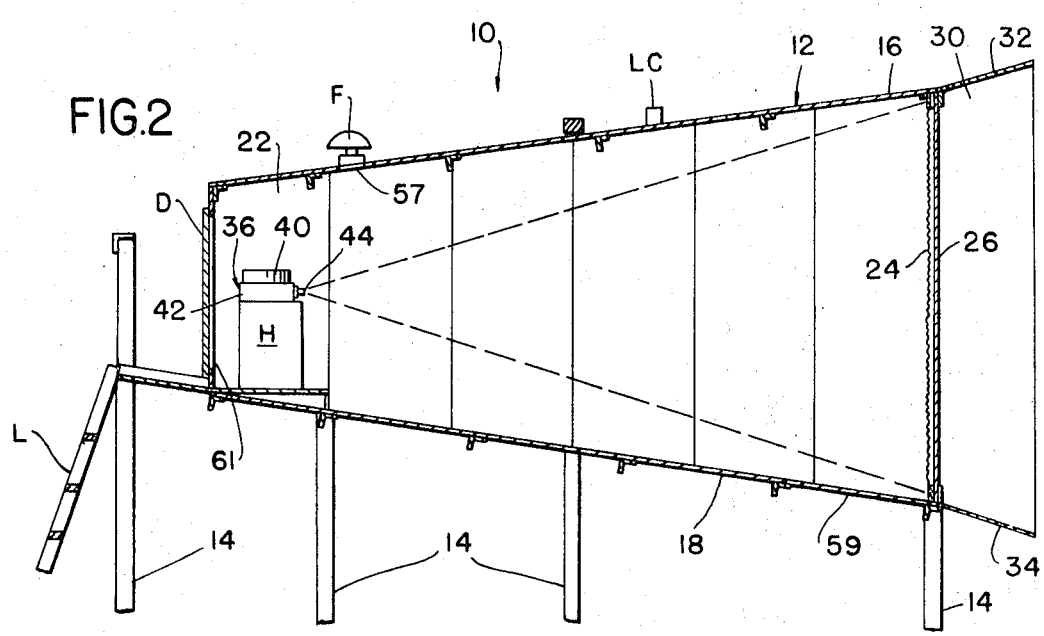
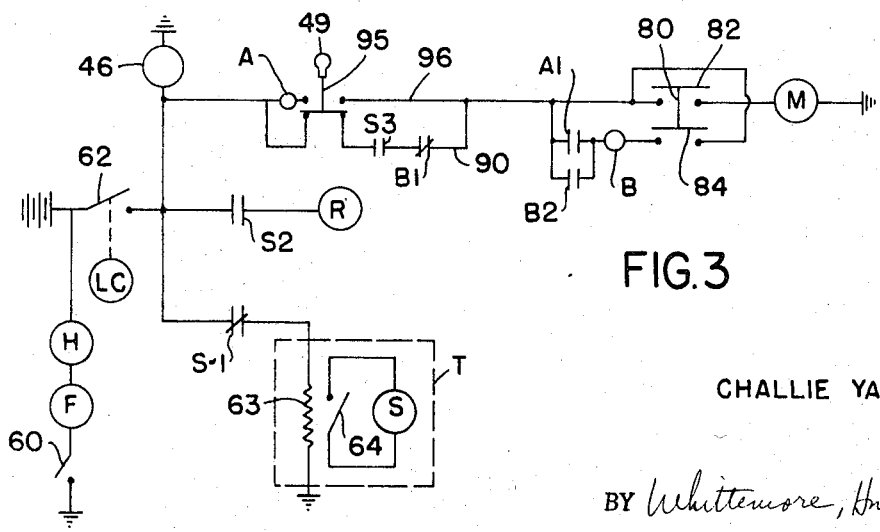
INVENTOR
CHALLIE YATES, JR.
BY Whittemore, Hulbert & Belknap
ATTORNEYS

United States Patent Office 3,552,845
Patented Jan. 5, 1971

3,552,845
DISPLAY DEVICE
Challie Yates, Jr., Ashland, Ky., assignor to Video Ads, Inc., Detroit, Mich., a corporation of Kentucky
Filed Feb. 19, 1968, Ser. No. 706,573
Int. Cl. G03b 12/22
U.S. Cl. 353—74                    3 Claims

ABSTRACT OF THE DISCLOSURE

The portable outdoor display device comprises an elongated housing, a projector within the housing for projecting a plurality of different images such as ads in sequence upon the projection screen closing the front end of the housing for viewing from the outside, light sensitive means for activating the projector when darkness falls and for de-activating it when sunlight appears and a thermostatically controlled heater and an exhaust fan for the housing.

SUMMARY OF THE INVENTION

It is a primary object of this invention to provide an outdoor display which is portable and comprises an elongated housing provided with a projector within the housing adapted to project a series of images upon a screen at the front of the housing in timed sequence for viewing from the outside.

Another object is to provide an outdoor display adapted to be used for advertising purposes.

Another object is to provide means for automatically activating and de-activating the projector.

Another object is to provide light sensitive means for activating the projector when darkness falls and for de-activating it when sunlight appears.

Another object is to provide means for controlling the temperature within the housing.

Other objects and features of the invention will become apparent as the description proceeds, especially when taken in conjunction with the accompanying drawings, wherein:

FIG. 1 is a perspective view of a display device embodying my invention.

FIG. 2 is a longitudinal sectional view of the device.

FIG. 3 is a wiring diagram.

FIG. 4 is an enlarged, fragmentary, semi-diagrammatic view of the projector.

Referring now more particularly to the drawings, the display device is generally designated 10 and comprises an elongated generally horizontal housing 12 supported on the ground by legs 14. The display device is adapted to be set up and installed out of doors in a prominent or conspicuous location and when used in accordance with its intended purpose will periodically flash different images such as advertising on the projection screen to be viewed from the outside by persons in front of the device. The display device may for example be set up at a busy intersection.

The housing comprises the elongated top and bottom panels 16 and 18 and the elongated side panels 20 and 22. The housing thus formed by the panels 18 to 22 is generally rectangular in cross section and preferably although not necessarily is tapered so as to be larger at the front end, where the projection screen is, then at the rear end.

There is a projection screen 24 closing the front end of the housing. The projection screen may be of any suitable material which will receive an image flashed upon it by a projector within the housing and present the image for viewing on the outside. The screen may, for example, be a silk screen of standard manufacture and may or may not be covered by a wind-shielding glass panel 26 over the outer side of the screen, as desired. It will be noted that a hood consisting of top, bottom and side panels 28, 30, 32 and 34 projects forwardly beyond the silk screen.

Within the housing and preferably located adjacent the rear end thereof is a projector 36 which may be of more or less standard construction and which is adapted to flash images upon the silk screen for viewing from the outside. The separate images or ads are carried upon individual slides or plates 38 carried by the circular drum or cartridge 40 mounted for rotation on top of the projector housing 42. The drum 40 has angularly spaced radial slots 43 throughout 360° in which the individual slides 38 are supported. The projector includes a lens 44 and a light source 46 behind the lens, and there is a slot 48 between the lens and light source and directly beneath the slotted portion of the drum 40 so that invididual slides may be dropped from the radial slots 43 of the drum into the slot 48 for projection upon the screen. As will become apparent from the description which follows, the drum 40 is periodically indexed and individual slides 38 are dropped in succession into the slot 48 and the images on the slides projected in sequence on the screen for viewing from the outside. The open bottoms of the radial slots 43, except for the one in register with the slot 48, are closed by the top of housing 42 to retain the slides therein.

A motor M is provided to index or rotate the drum 48. The motor has a cam 49 on its drive shaft to shut off the motor when it has indexed the drum to bring the next radial slot 43 into register with the slot 48.

A bellcrank 50 is provided for returning a slide 38 from slot 48 to a registering radial slot 43 in the drum. Bellcrank 50 has an arm 52 engageable with the slide and an arm 54 operated by the rod 56 of a piston (not shown) in air cylinder 58. The air cylinder is shown in its normally spring-retracted position and valve V is provided to admit air to the cylinder to extend the piston thereof.

Preferably a heater H and an exhaust fan F are provided for the display device 10. The heater H may be a standard electrically operated heater and it is shown within the housing at the rear thereof having the projector 36 mounted upon the heater. If found convenient, the heater may be located in some other part of the housing 10. The exhaust fan F may be a standard exhaust fan and is mounted on top of the housing and draws air through the opening 57 in the top wall of housing 12. If desired, a controlled amount of outside air may be admitted to the housing for circulation by the exhaust fan F through a grill having small apertures and located in one of the panels 16–22 such as the grill 59, for example. As seen in FIG. 3, the heater H and exhaust fan F are in a thermostatically controlled circuit, controlled by the bimetal switch 60, so as to be operated when the switch closes in response to a drop in the temperature within the housing below a predetermined level.

A door D is hinged to the rear of the housing and when closed covers the access opening 61. An attendant may enter the housing through this opening 61 when the door is opened.

There is also provided a light cell or light sensitive element LC on the outside of the housing. This element LC is sensitive to light and is designed to operate the projector 36 during darkness and to deactivate it during the daylight hours.

In the operation of the device, the heater H and exhaust fan F as already noted are operative twenty-four hours a day when called upon by the thermostatic switch 60 in response to a predetermined drop in temperature within the housing. Hence the temperature within the housing is maintained at a predetermined level at all times by heater H and the exhaust fan F keeps the air clear within the housing.

A ladder L at the rear of the housing provides a means to climb from the ground up to the access opening 61.

As seen in FIG. 3, the light cell LC controls the circuit which operates the projector 36 so that the projector is operative during the hours of darkness but is deactivated during the daylight hours. Thus during the daytime light cell LC will in response to daylight maintain the switch 62 open to deactivate the projector. However, when darkness falls the light cell LC closes the switch 62 and keeps it closed until daylight appears. The closing of switch 62 closes the circuit to the timer T through the normally closed contact S1 of solenoid S, solenoid S being a part of the timer. The timer T is provided to produce a periodic indexing of the projector 36 and hence a periodic change in slides projected by the projector 36 upon the viewing screen 24. Current to the timer T heats the heating element 63 to a point where the heat responsive switch 64 closes to energize solenoid S, opening its normally closed contact S1 and thus discontinuing the current to heating element 63. As the heating element 63 cools, switch 64 opens deenergizing solenoid S and causing its contact S1 to return to its normally closed position. Thus the timer T is periodic in its operation and determines the sequence of operation of the projector.

Let it be assumed that the apparatus is in the position of the parts shown in FIGS. 3 and 4 (except that switch 62 is closed) in which a slide has dropped into the slot 48 of the projector 36 and is projected onto the screen 24. Now when switch 64 closes, the contacts S2 and S3 close. Closing of contact S2 energizes relay R and the energization of relay R shifts valve V to admit air from line 74 to cylinder 58 causing its rod 56 to be extended and rotating the bell crank 50 counterclockwise so as to lift the slide from slot 48 and return it to the drum 40. When the bell crank 50 has been rotated sufficiently to return the slide to its slot in the drum, the rod 56 of the cylinder engages and closes switch 80, thereby closing its switch contacts 82 and 84. A circuit is now completed to motor M through the bypass circuit 90 and contact 82 of switch 80. The operation of motor M causes the drum 40 to index or rotate through a small arc sufficient to cause to next radial solt of the drum to move into register with slot 48 of the projector. The motor has a cam 49 on its drive shaft which begins to rotate with the operation of the motor to immediately cause switch 95 to open the bypass circuit 90 and close the circuit 96 to continue the current to motor M. The closing of circuit 96 takes place before the breaking of bypass 90 so that the operation of motor M is continuous. As a result, solenoid A is energized causing its contact A1 to close and energizing solenoid B across contact 84 of switch 80. Energization of solenoid B opens its normally closed contact B1.

When the cam 49 completes one revolution it returns the switch 95 to the position shown opening circuit 96. The solenoid A is deenergized upon the return of switch 95 to the illustrated position, but the circuit to relay B is maintained through the holding circuit contact B2 so that contact B1 remains open. The bypass circuit 90 is thus open so that current to the motor M is interrupted and the indexing of drum 40 is thereupon terminated with the next radial slot in register with slot 48. When the timer contact 64 again opens to deenergize solenoid S, contact S2 is opened to deenergize relay R and cause valve V to shift and place the exhaust line 110 in communication with the air cylinder 58 to permit normal spring retraction of the air cylinder and to allow the next slide to drop into slot 48. The return of the piston of the air cylinder causes motor switch 80 to reopen.

The new slide will remain in slot 48 for viewing for a period of 10 seconds, for example, or for any desired period of time depending upon the period of the timer T. It will be apparent that the slides in the drum 40 will thus be projected upon the screen 24 in a timed sequence and that this process will continue indefinitely until the circuit is deenergized by the appearance of daylight which causes the opening of switch 62.

The display device is portable and may be readily picked up and moved from one site to another.

While the specific projector and timer disclosed herein are well suited to the purposes of the present invention it will be understood that within the broad concept of the invention projectors and timers of other specific constructions may be employed.

What I claim as my invention is:

1. A portable outdoor display device, comprising an elongated housing, a projection screen closing the front end of said housing, a projector within said housing adjacent the rear end thereof adapted to project images upon said screen for viewing beyond the front end of said housing, electrical circuitry including timer-operated means for operating said projector to cause the same to project a plurality of said images individually upon said screen in a predetermined timed sequence, a switch in said electrical circuitry, light sensitive means connected to said switch for automatically activating said timer-operated means when darkness falls and deactivating said timer-operated means when sunlight appears, a heater for said housing, and thermostatically operated means independent of said light sensitive means for rendering said heater operative or inoperative depending upon the temperature within said housing.

2. The portable outdoor display device defined in claim 1, including an access opening adjacent the rear of said housing for access to said projector, and a hinged closure for said access opening.

3. The portable outdoor display device defined in claim 2, including a platform at the rear of said housing adjacent to said access opening.

References Cited

UNITED STATES PATENTS

| | | | |
|---|---|---|---|
| 1,164,937 | 12/1915 | Gillam | 353—74 |
| 2,967,981 | 1/1961 | Wise | 317—124 |
| 3,205,771 | 9/1965 | Harrison et al. | 353—75X |
| 3,373,654 | 3/1968 | Carolan et al. | 353—78 |
| 3,412,232 | 11/1968 | Sanders | 236—49X |

EUGENE R. CAPOZIO, Primary Examiner

R. CARTER, Assistant Examiner

U.S. Cl. X.R.

40—132